(No Model.)
R. S. RUTTER.
SUBMERGED WATER HEATER.
No. 504,247. Patented Aug. 29, 1893.
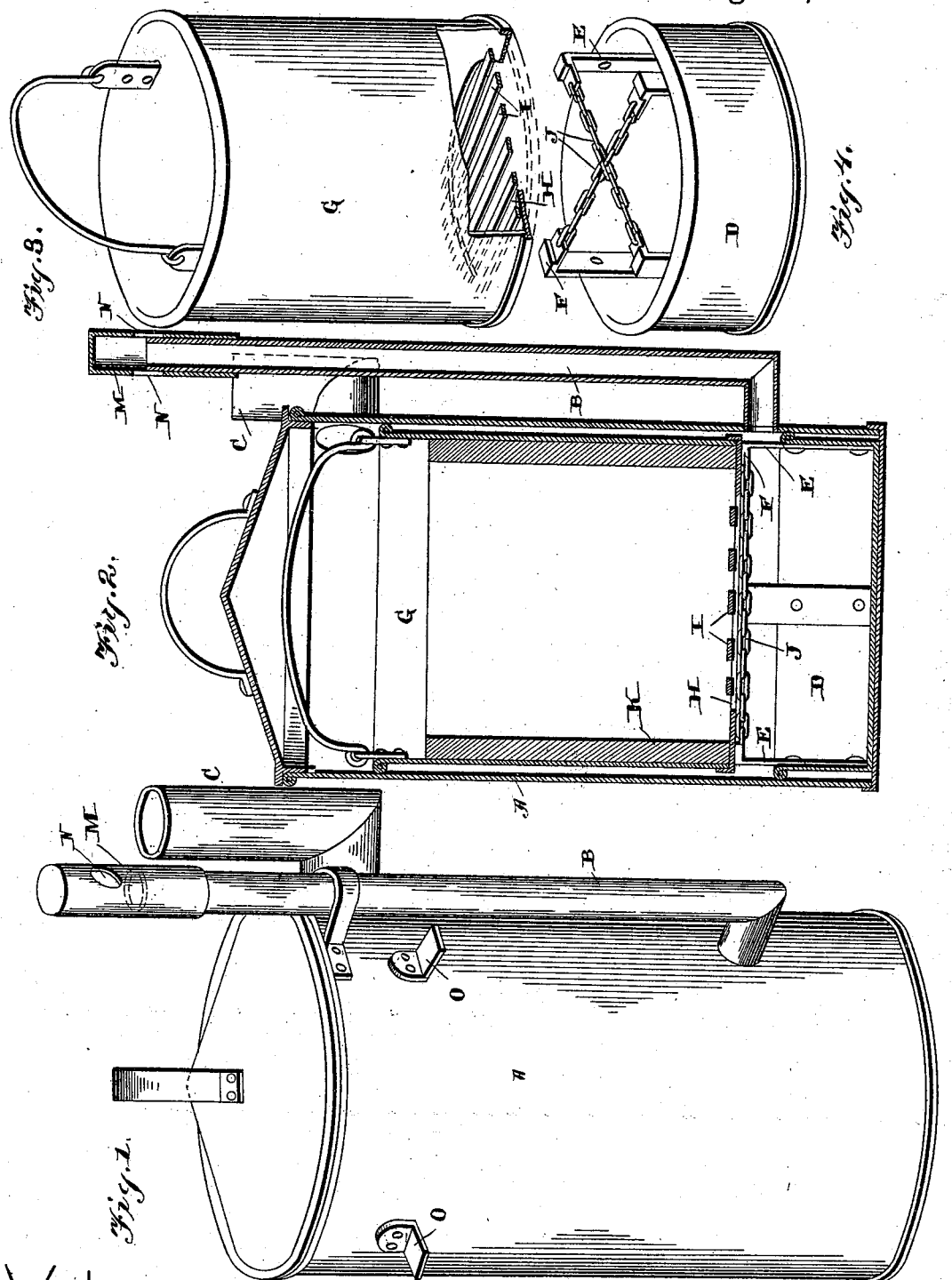

UNITED STATES PATENT OFFICE.

RICHARD S. RUTTER, OF WARSAW, INDIANA.

SUBMERGED WATER-HEATER.

SPECIFICATION forming part of Letters Patent No. 504,247, dated August 29, 1893.

Application filed March 3, 1893. Serial No. 464,570. (No model.)

*To all whom it may concern:*

Be it known that I, RICHARD S. RUTTER, of Warsaw, in the county of Kosciusko and State of Indiana, have invented certain new and useful Improvements in Submerged Water-Heaters; and I do hereby declare the following to be a full, clear, and exact description of the invention, such as will enable others skilled in the art to which it pertains to make and use it, reference being had to the accompanying drawings, which form part of this specification.

My invention relates to an improvement in submerged water heaters; and it consists in the novel features of construction hereinafter fully described and especially referred to in the claims.

The object of my invention is to provide an improved heater in which the fire pot and ash pan are distinct vessels and removable from the outer casing, whereby the latter is kept entirely clear of dirt and ashes.

A further object of my invention is to provide an improved portable heater which may be used for heating water in bath tubs, barrels, tanks or other water containers, which is very compact and which may be moved from place to place with ease.

Referring to the accompanying drawings:—Figure 1, is a perspective view of my improved heater. Fig. 2, is a vertical sectional view of the same. Fig. 3, is a detached perspective view of the fire pot. Fig. 4, is a similar view of the ash pan.

The inclosing casing of my improved heater consists of the cylindrical vessel A closed at its lower end and open at its upper end.

B is a draft inlet pipe extending up the outside of the casing A and which enters the same at a point near its lower end.

C is the exit flue communicating with the casing A near its upper end as shown.

Adapted to rest within and on the bottom of the casing is the ash pan D, the top of the vertical wall of which is below the inlet or draft pipe B.

Projecting upward from the pan are the supports E having their upper ends turned inward as at F. These supports project above the inlet of said pipe and adapted to rest thereon is the removable fire pot G.

The central portion of the bottom H is open and extending across the same are the bars I which constitute a grate for the fire. The distance between the peripheries of the bottom opening and the bottom itself is the same as the length of the inturned arms F of supports E, so that the said arms are not exposed to the direct heat of the coals. Chains J connect the arms F and thus form a very convenient lifting device for removing the pan. The fire pot is provided with a lining K of any suitable material and also with a lifting bale E.

M is a cap movable vertically on the upper end of pipe B having formed in its sides the openings N. By moving the cap down on said pipe so that said openings are below the end of the same the draft will be entirely cut off and in this manner the fire may be extinguished. The cap may be adjusted with portions of its openings obstructed by the pipe end for the purpose of checking or regulating the draft. Perfect control of the draft is thus secured and a slow or hot fire may be had at will.

Ears O project laterally from the container for the purpose of supporting the heater within a tank.

In operation the fire is started in the pot which is then placed in the casing resting on the supports E, or it may be started when the pot is in position. As the arms E hold the ash pan and fire pot separated at the point where the pipe B enters the casing air is readily drawn into the same by the upward draft of heat from the fire, and as the top edge of the fire pot is below exit pipe or flue C the latter forms a ready outlet for the draft and smoke. By this arrangement a perfect circulation is secured which will support a steady fire within the heater.

Having thus fully described my invention, what I claim, and desire to secure by Letters Patent, is—

1. A heater comprising a casing, a removable ash pan therein, supports projecting vertically therefrom, a removable fire pot adapted to rest thereon, a draft pipe entering the casing between the pan and pot, and an exit flue above the fire pot, substantially as shown and described.

2. A heater comprising a casing, a removable ash pan therein, supports projecting therefrom, inwardly extending arms at the upper ends of the supports a removable fire pot adapted to rest on the supports having a grated opening in its bottom, a draft inlet pipe leading to the casing between the ash pan and fire pot, and an exit flue above the fire pot, substantially as shown and described.

3. A heater comprising a casing, a removable ash pan therein, supports projecting vertically from the pan, chains connecting the same, a fire pot adapted to rest on the supports, a draft inlet pipe entering the casing between the pan and pot, and exit flue, substantially as shown and described.

4. A heater comprising a casing, an ash pan therein, supports projecting vertically therefrom, inturned arms at the inner ends of the supports, a fire pot, a recessed and grated bottom for the fire pot, the width of the bottom between its outer side and the recess being the same as the length of said arms at the upper ends of the supports, and draft inlet and exit pipes, substantially as shown and described.

In testimony whereof I affix my signature in presence of two witnesses.

RICHARD S. RUTTER.

Witnesses:
JAMES M. THOMAS,
HARRIET D. FRAZER.